United States Patent [19]
McKee

[11] 3,953,777
[45] Apr. 27, 1976

[54] CONTROL CIRCUIT FOR SHUTTING OFF THE ELECTRICAL POWER TO A LIQUID WELL PUMP

[75] Inventor: Fount E. McKee, Houston, Tex.
[73] Assignee: Delta-X Corporation, Houston, Tex.
[22] Filed: Feb. 12, 1973
[21] Appl. No.: 331,804

[52] U.S. Cl. ............................... 318/474; 317/31; 318/455; 417/45
[51] Int. Cl.² ................................ H02P 1/04
[58] Field of Search ............... 318/447, 474, 455; 417/12, 42, 45; 317/13, 31

[56] References Cited
UNITED STATES PATENTS
3,417,290  12/1968  Craddock ........................ 317/31
3,440,512  4/1969   Hubby ............................ 318/447

Primary Examiner—David Smith, Jr.
Attorney, Agent, or Firm—Fulbright & Jaworski

[57] ABSTRACT

A control circuit for turning off the power to the pump drive motor when the pump has exhausted the supply of liquid in the well. Means for sensing the instantaneous current to the pump motor and a circuit measuring the average current drawn by the pump drive motor, and turning off the power when the average current decreases below a preset level. An RC circuit having a time constant greater than the time required for the pump to complete one full pumping cycle for measuring the average current to the motor, and a comparator controlling switching means to shut off the power when the average current to the motor decreases to a predetermined amount. A reference voltage supplied to the comparator from an amplifier connected to the electrical power in which the output of the amplifier varies inversely to variations of the voltage of the electrical power thereby preventing fluctuations in the supply voltage from adversely affecting the control circuit.

5 Claims, 1 Drawing Figure

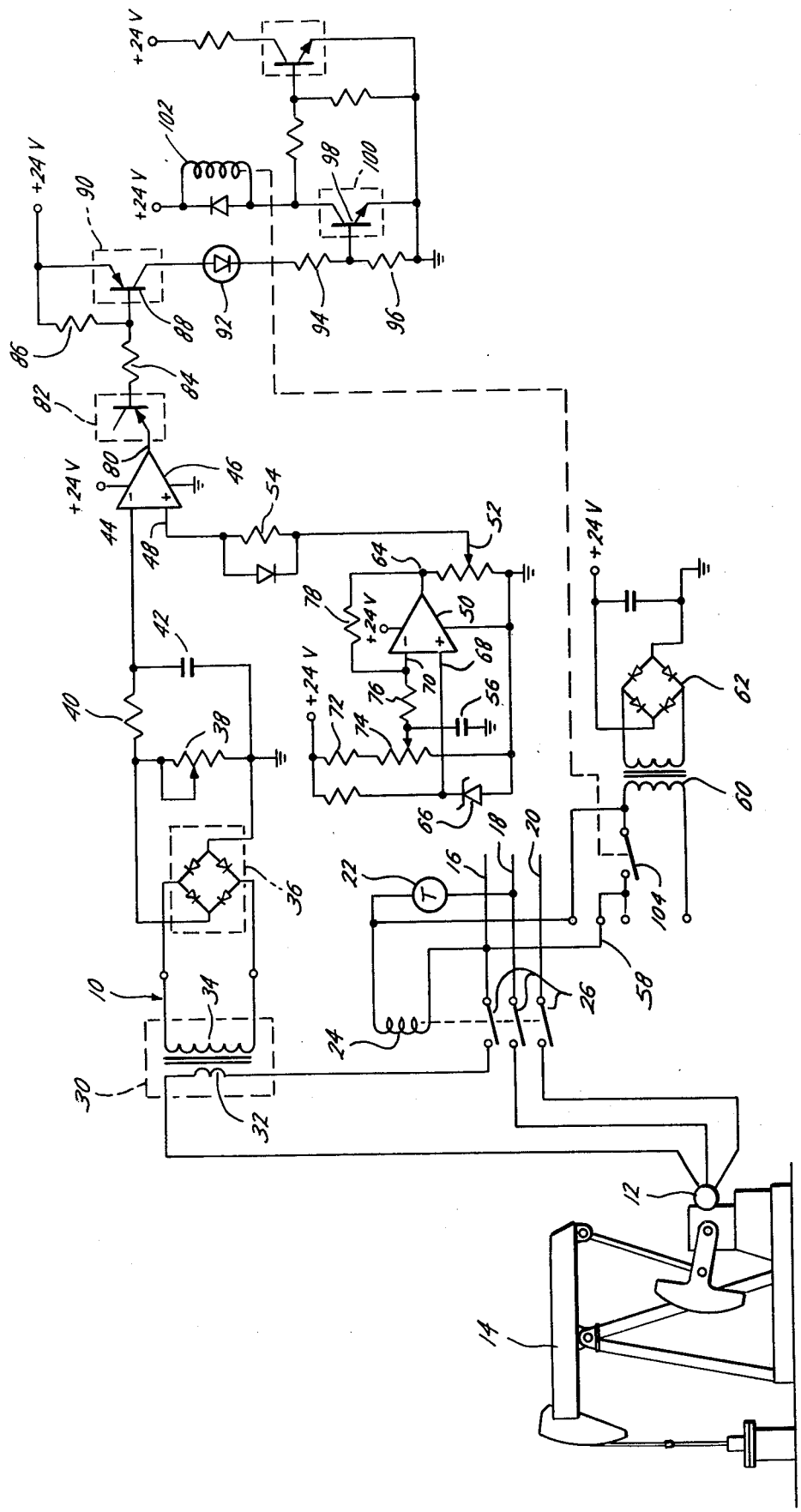

CONTROL CIRCUIT FOR SHUTTING OFF THE ELECTRICAL POWER TO A LIQUID WELL PUMP

BACKGROUND OF THE INVENTION

Generally, oil well pumping units run continuously or run in a predetermined cyclic fashion as set by a timer. In the cyclic mode, the pumping unit runs for some preset time, whether it was actually pumping fluid or not, and stays off for some other preset time. When the pumping unit is running and not pumping fluid, damage is incurred by the pump, rod string, gear boxes and other equipment and power is being consumed. Various control circuits have been proposed as shown in U.S. Pat. Nos. 2,947,931; 3,413,535; and 3,440,512, to shut off the power to the pump drive motor when the supply of liquid in the well has been pumped dry to prevent damage and the use of unnecessary power.

The present invention utilizes the fact that the average power required by the pump drive motor is less when no liquid is being produced from the well than when liquid is being produced, and provides a novel control circuit for measuring the average current and turning off the pump drive motor when the average current decreases below a preset level.

However, another problem is that oil well pumping units are usually found at locations and under conditions in which the electrical supply power to the pumping motor may vary considerably thereby adversely affecting the control circuit which is measuring the load power to the pump motor against some predetermined voltage level. The present invention provides a compensation circuit to offset the variations of the power supply voltage.

SUMMARY

The present invention utilizes a control circuit which measures the average current used by the pump drive motor of a fluid well pump and when the average current decreases below a preset level, the power is turned off. The control circuit uses an RC circuit measuring the instantaneous current to the pump motor in which the RC circuit has a time constant greater than the time required for the pump to complete one full pumping cycle whereby the RC circuit senses the average cyclic current drawn by the motor. In addition, the impedance of the charging path and the impedance of the discharging path of the condenser in the RC circuit is substantially the same whereby the circuit accurately measures the average current drawn by the pump motor.

A further object of the present invention is the comparison of the measured average current used by the pump drive motor with a preset reference for actuating switching means to turn off the power to the motor when the average current decreases to a predetermined amount.

Yet a still further object of the present invention is obtaining a reference voltage from an amplifier which is connected to the same electrical power supply as the pump motor in which the output of the amplifier varies inversely to variations of the line voltage of the electrical supply power.

Still a further object of the present invention is the provision of a reference voltage amplifier which includes two inputs, one of which is a stable temperature compensated zener diode and the second of which includes a voltage divider network.

Other and further objects, features and advantages will be apparent from the following description of the presently preferred embodiment of the invention, given for the purpose of disclosure and taken in conjunction with the drawing.

BRIEF DESCRIPTION OF THE DRAWING

The drawing is a schematic showing the electrical control circuit of the present invention for shutting off the power to the electrical motor of a conventional oil well pump.

DESCRIPTION OF THE PREFERRED EMBODIMENT

Referring now to the drawing, the reference numeral 10 generally indicates the control circuit for turning off the power to a drive motor 12 of a conventional oil well pumping unit 14. The electrical power supply to the motor 12 may include one or more electrical supply lines 16, 18 and 20. A suitable timer 22 is provided which is preset to periodically turn on the motor 12 such as by actuating a relay 24 which in turn closes contacts 26 to connect the electrical power supply to the motor 12. The timer 22 turns off after a short interval and de-energizes the relay coil 24 which opens the contacts 26 to turn off the electrical power to the motor 12 unless the control circuit 10, as hereinafter described, energizes the relay 24 holding the contacts 26 in a closed position.

A current transformer 30 is provided having a primary 32 in one of the supply lines, such as 16, to the pump drive motor 12 for sensing the instantaneous current to the motor 12 which is an indication of the load exerted by the pumping unit 14. The secondary 34 of the current transformer 30 supplies an alternating current voltage, proportional to the current in the primary coil 32 to bridge rectifier circuit 36. The bridge rectifier circuit 36 converts the alternating current voltage to a full wave rectified direct current voltage. A variable resistor 38 is conncted across the output of the bridge 36 to provide a variable load for the secondary 34 of the current transformer 30. By use of the variable resistor 38 the output voltage of the transformer 30 may be varied regardless of the motor load. In operation, the variable resistor 38 is adjusted, for example, until the average voltage across it is approximately 5 volts. The voltage across the variable resistor 38 is fed through a resistor 40 to a capacitor 42 which form an RC circuit. The voltage across the capacitor 42 very nearly approaches the average of the voltage appearing across variable resistor 38. The voltage across the capacitor 42 is fed to one input 44 of an electronic comparator 46, Referring to the RC circuit, it is to be noted that the value of the resistor 40, which may be 56K and the value of the resistor 38 which is 10K and generally is varied to provide a resistance of 2 or 3K is such that the impedance of the charging path through the condenser 42 is substantially equal to the impedance of the discharging path from the condenser 42 so that the RC circuit accurately senses the average current to the motor. That is, the impedance of the charging path generally includes only the resistance of resistor 40 and the impedance of the discharge path includes the resistance of the resistor 40 plus the small amount of resistance of resistor 38. In addition, it is to be further noted that the RC circuit has a time constant greater than the time required for the pump to complete one full pumping cycle. In one satisfactory embodiment, the value of the time constant was approximately 5 times a complete pumping cycle whereby the RC circuit measures the average current required by the pump drive motor 12. The circuit 10 is not required to make intricate differentiations in the fluctuations in the load occurring during a single cycle as in some prior art devices.

The voltage applied to the input 44 of the comparator 46 is compared to an adjustable reference voltage applied to the input 48 of the comparator 46. The adjustable voltage reference on input 48 is supplied from an amplifier 50, and variable voltage divider 52.

The power supply for the control circuit 10 is obtained by a connection 58 to one of the electrical power supply lines to the motor 12, such as 16, through a step-down transformer 60 and rectifier 62 to provide an output, such as a 24 volt power supply. It is noted that the power supply for the control circuit 10 and the power supply for the oil pump drive motor 12 both are obtained from the same electrical source. Frequently, in the oil fields, the line voltage of the supply line varies, which would adversely affect the control circuit 10. That is, if the supply line voltage decreases, the supply current would increase, thereby indicating, to the transformer 30 and the RC circuit consisting of resistor 40 and capacitor 42, a higher output giving a false indication that the pumping unit 14 was still pumping fluid which may or may not be true. In addition, the sensing voltage applied to input 44 is to be compared with a reference voltage on input 48, but if the reference voltage changes due to line voltage fluctuations, then it would be difficult to measure the average current drawn by the pump drive motor against a predetermined level. Therefore, the amplifier 50 is provided to vary opposite, or inversely, to the variations of the line voltage. That is, if the line voltage to the supply power lines 16, 18 and 20 increases, the output 64 of the amplifier 50 decreases. On the other hand, if the line voltage decreases, the output 64 of the amplifier 50 increases. That is accomplished by using a stable temperature compensated zener diode 66 connected to one input 68 of the amplifier 50. The other amplifier input 70 is supplied from a voltage divider and filter consisting of a resistor 72, variable resistor 74, and capacitor 56 connected to the unregulated supply voltage. Resistors 76 and 78 make up the input and feedback resistors of the conventional operation amplifier 50. Therefore, since the unregulated supply voltage follows the variations of the supply line voltage, it can be seen that any variations of voltage on the wiper of the variable resistor 74 will be reflected in opposite variations of voltage at the output 64 of the amplifier 50 to compensate for variations in line voltage noted at the input 44 from the sensing and RC circuits. The variable resistor 52 allows the precise adjustment of the point at which the comparator 46 will change state and serves to provide the predetermined voltage level being compared with the average current measurement.

When pump 14 is pumping liquid and therefore draws a greater load current in line 16, the voltage on the input 44 of the comparator 46 is more positive than the referenced voltage on input 48, and the output 80 of the comparator 46 will be low. Therefore, current will flow through zener diode 82, resistor network 84 and 86 and the base 88 of transistor 90. The flow of base current will cause transistor 90 to conduct which allows current to flow through a visual indicator 92 and resistors 94 and 96. Resistors 94 and 96 comprise a voltage divider which supplies a voltage to base 98 of transistor 100. This causes transistor 100 to conduct and energize relay 102 which actuates and closes relay contact 104 to keep power supplied to the power supply of the control circuit 10. As previously mentioned, prior to the closing of contact 104, power is supplied through the contacts of timer 22. The timer 22 turns on power to both the pump drive motor 12 and the circuit 10 for a short specified time, but after relay 102 is actuated the timer contacts can drop out and the control circuit receives power and maintains control through contact 104. However, in the event that the average current required by the pump drive motor 12 drops below a predetermined level, as indicated by the comparator 46, power to the relay 102 ceases. The contact 104 opens, disconnecting power to the control circuit 10, and also disconnecting power to the relay 24 thereby opening the contacts 26 disconnecting power from the motor 12. After a predetermined time, the timer 22 is then again actuated and the motor 12 and pumping unit 14 is run until the well is again pumped dry.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts, may be provided without departing from the spirit of the invention and the scope of the appended claims.

What is claimed is:

1. A circuit for shutting off the electrical power to the drive motor of a liquid well pump comprising,
    means for sensing the instantaneous current to the motor,
    an RC circuit connected to and receiving the output from the sensing means, the RC circuit having a time constant greater than the time required for the pump to complete one full pumping cycle and the impedance of the charging path and the impedance of the discharging path of the condenser in the RC circuit being substantially the same whereby the RC circuit senses the average current drawn by the motor,
    a comparator connected to the RC circuit,
    a reference voltage connected to the comparator, said reference voltage is obtained from an amplifier connected to the electrical power, and in which the output of the amplifier varies inversely to variations of voltage of the electrical power, and
    switching means connected to the output of the comparator and to the electrical power to the motor, said switching means actuated by the comparator when the average current to the motor decreases to a predetermined amount for shutting off power to the motor.

2. The apparatus of claim 1 wherein the amplifier includes two inputs, one of which is a stable temperature compensated zener diode, and the second of which includes a voltage divider.

3. A circuit for shutting off the electrical power to the drive motor of a liquid well pump when the pump has exhausted the supply of liquid comprising,
    means for sensing the instantaneous alternating current to the motor,
    a bridge circuit connected to the sensing means for converting the alternating current to direct current voltage, an RC circuit connected to the output of the bridge circuit, the RC circuit having a time constant greater than the time required for the pump to complete one full pumping cycle, and the impedance of the charging path and the impedance of the discharging path of the condenser in the RC circuit being substantially the same whereby the RC circuit senses the average current to the motor, a comparator connected to the RC circuit, a reference voltage connected to the comparator, the reference voltage is obtained from an amplifier connected to the electrical power supply and in which the output of the amplifier varies inversely to variations of voltage of the electrical power, and switching means connected to the output of the comparator and to the electrical power supply to the motor, said switching means actuated by the comparator when the average current to the motor decreases to a predetermined amount for shutting off power to the motor.

4. A circuit for shutting off the electrical power to the drive motor of a liquid well pump when the pump has exhausted the supply of liquid comprising, means for sensing the current supplied to the motor, a comparator having two inputs one of which is connected to the output of the sensing means, an amplifier connected to the electrical power and having an ouput connected to the second input to the comparator, the output of the amplifier varying inversely to variations of the voltage of the electrical power supply, and switching means connected to the output from the comparator and controlling the electrical power, said switching means actuated by the comparator when the current to the motor decreases to a predetermined amount for shutting off power to the motor.

5. The apparatus of claim 4 wherein the amplifier includes two inputs, one of which is a stable temperature compensated diode, and the second of which includes a voltage divider.

* * * * *